Figure 3:
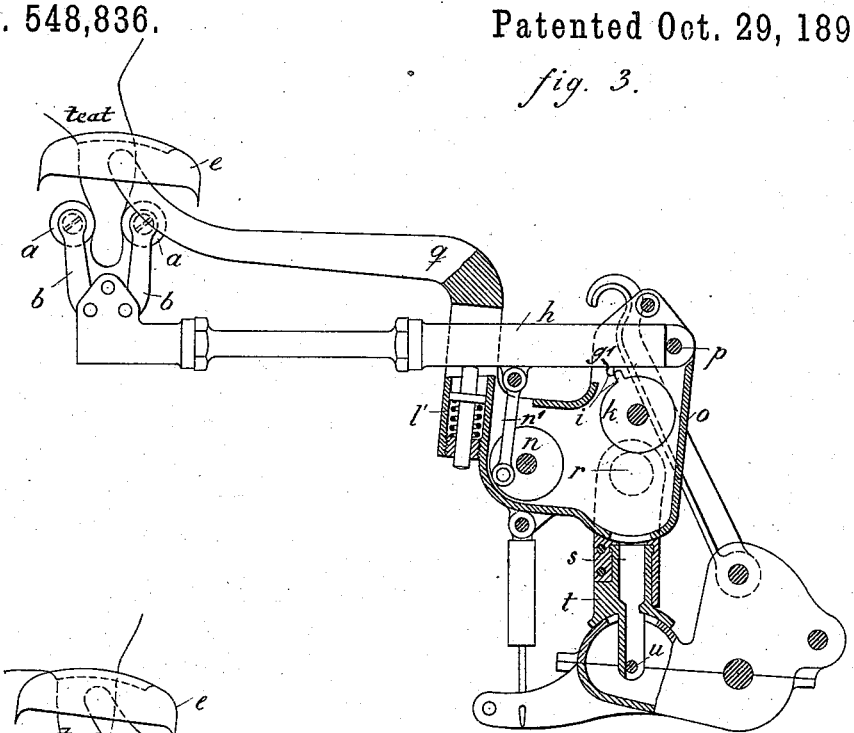

(No Model.) 2 Sheets—Sheet 1.
C. G. P. DE LAVAL.
MECHANICAL MILKING APPARATUS.
No. 548,836. Patented Oct. 29, 1895.
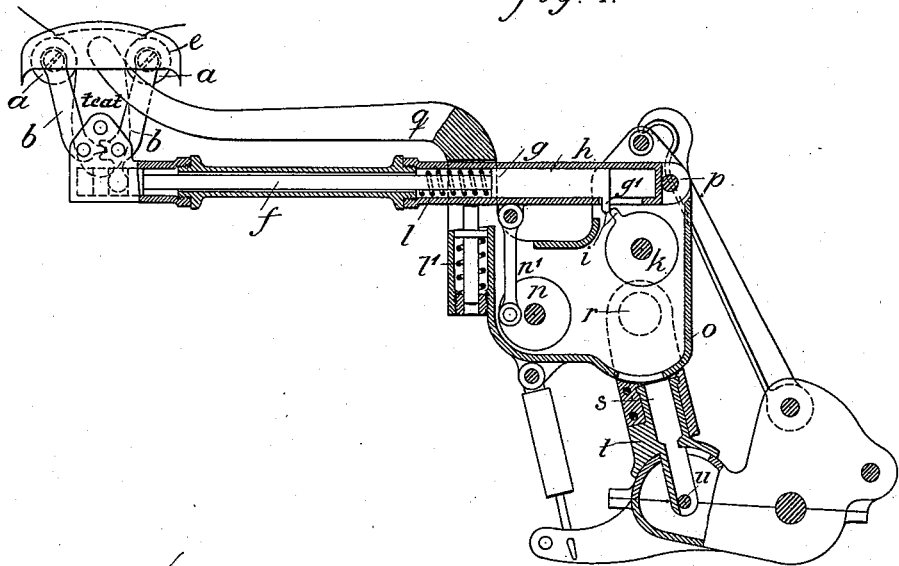
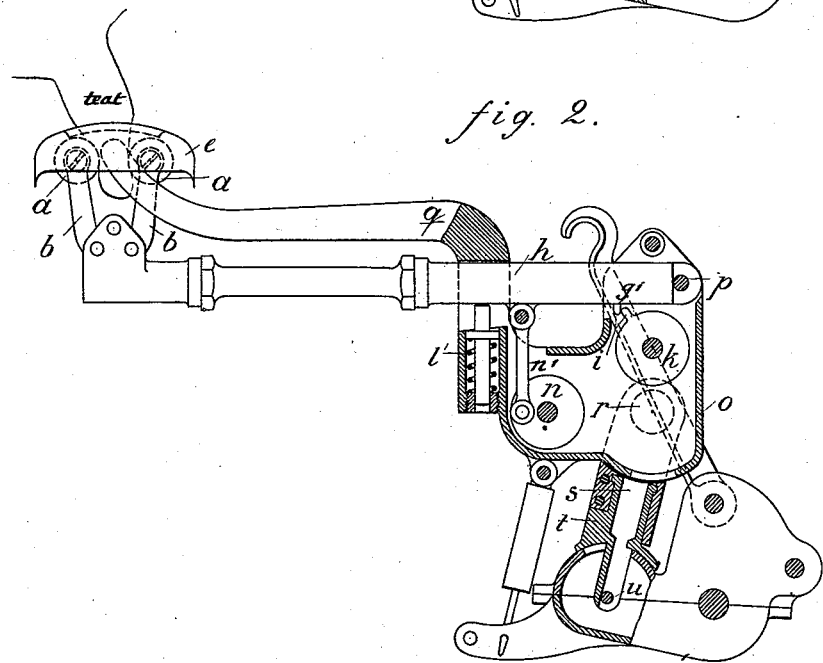
WITNESSES:
Juan C. Abel
K. R. Brennan
INVENTOR
Carl Gustaf Patrik de Laval
BY Goepel & Raegener
ATTORNEYS.

(No Model.) 2 Sheets—Sheet 2.

C. G. P. DE LAVAL.
MECHANICAL MILKING APPARATUS.

No. 548,836. Patented Oct. 29, 1895.

WITNESSES:
Juan C. Abel
K. R. Brennan

INVENTOR
Carl Gustaf Patrik de Laval
BY
ATTORNEYS.

ANDREW B.GRAHAM. PHOTO-LITHO. WASHINGTON, D.C.

United States Patent Office.

CARL GUSTAF PATRIK DE LAVAL, OF STOCKHOLM, SWEDEN.

MECHANICAL MILKING APPARATUS.

SPECIFICATION forming part of Letters Patent No. 548,836, dated October 29, 1895.

Application filed August 25, 1894. Serial No. 521,270. (No model.) Patented in Sweden February 3, 1894, No. 5,784; in England February 3, 1894, No. 14,845; in Norway August 2, 1894, No. 3,878; in France August 2, 1894, No. 240,492; in Belgium August 2, 1894, No. 111,238; in Spain September 12, 1894, No. 16,121; in Italy September 30, 1894, No. 36,924; in Canada November 19, 1894, No. 47,512; in Victoria November 19, 1894, No. 11,838; in South Australia November 21, 1894, No. 2,821; in New South Wales November 21, 1894, No. 5,465; in Tasmania November 22, 1894, No. 1,365; in Western Australia November 27, 1894, No. 582; in New Zealand November 28, 1894, No. 7,294; in Hungary April 5, 1895, No. 2,539; in Austria April 6, 1895, No. 1,224, and in Denmark April 6, 1895, No. 27.

*To all whom it may concern:*

Be it known that I, CARL GUSTAF PATRIK DE LAVAL, doctor of philosophy, a citizen of Sweden, residing in Handtverkaregatan 16 A, Stockholm, Sweden, have invented certain new and useful Improvements in Mechanical Milking Apparatus, (for which I have obtained patents in Sweden, No. 5,784, dated February 3, 1894; in Norway, No. 3,878, dated August 2, 1894; in Denmark, No. 27, dated April 6, 1895; in England, No. 14,845, dated February 3, 1894; in France, No. 240,492, dated August 2, 1894; in Belgium, No. 111,238, dated August 2, 1894; in Spain, No. 16,121, dated September 12, 1894; in Italy, No. 36,924, dated September 30, 1894; in Austria, No. 1,224, dated April 6, 1895; in Hungary, No. 2,539, dated April 5, 1895; in Canada, No. 47,512, dated November 19, 1894; in Victoria, No. 11,838, dated November 19, 1894; in South Australia, No. 2,821, dated November 21, 1894; in New Zealand, No. 7,294, dated November 28, 1894; in New South Wales, No. 5,465, dated November 21, 1894; in Western Australia, No. 582, dated November 27, 1894, and in Tasmania, No. 1,365, dated November 22, 1894,) of which the following is a specification.

It is a fact that of the many mechanical contrivances for milking which have been invented, and which differ in their construction more or less from one another, not one is found in general use nor has any practical device been made by which a large number of cows can be simultaneously milked from one common center of power. To attain this latter purpose, I make use of the invention described below, and in order to make the same more fully intelligible reference is made to the accompanying drawings, in which—

Figure 4:
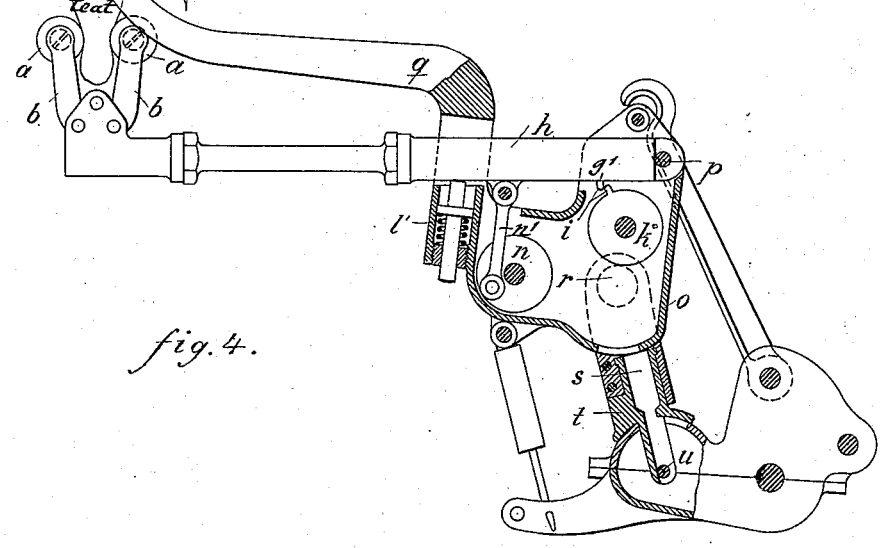

Figure 1 represents a sectional side elevation of my improved milking apparatus, and Figs. 2, 3, and 4 are similar elevations showing the various positions taken by the milking organs at the beginning of the milking operation.

Similar letters of reference indicate corresponding parts.

All mechanical milking-machines up to the present had to be "set" by hand before the commencement of the milking operation and maintain during this operation the position once given to them. The teats, however, do not maintain a constant position during the operation, for, on the one hand, the udder contracts during milking, and, on the other hand, disturbances resulting from the movement of the cow must be taken into consideration. With the machines heretofore in use the teats are liable to be brought into a position unfavorable to the working parts of the machine, by which the regular operation of the teats is impeded. Further, the adjustment of the milking device by the eye is unsatisfactory, as it is not at all certain that the teats are placed in the proper position in relation to the operative parts of the milking-machine.

In the present invention the milking organs of the machine have this peculiarity, that they automatically set or adjust themselves during the milking operation as may be required by the teats—viz., that they automatically adjust themselves in relation to the teats. To attain this result, the means employed present a combination of the following conditions, to wit: first, the milking organ is arranged so as to be easily movable in relation to the teat, whereby the forces generated by the straining of the teat during milking are able to adjust said organ; second, the necessary resistance or "kick" against the drawing operation of the milking organ on the teat takes place at the base of the teat, and, third, the milking organ is movable in relation to that part of the apparatus offering said resistance or kick similarly to the resistance of one leg of a pair of scissors to the other leg, so that the force present in the teat in an opposite direction to the milking force is taken up by this kicking part of the apparatus, and is thus limited to traverse only the teat of the cow.

By the apparatuses heretofore known, which have been placed on the ground or placed on a support applied to the cow, the necessary resistance or kick has taken place against the ground or against said support, and the force above mentioned had to traverse the whole cow, or at least the udder.

Such an automatic adjustment or "setting" is only made possible by the employment of a combination of the before-mentioned conditions, for when the teat has once been gripped by the milking organ it is strained or held tight between the latter and that part of the apparatus by which the said resistance or kicking is performed, so that this part is thereby caused to slide up to the base of the teat. During this movement the milking organ is moved, owing to its easily-movable arrangement above mentioned, in such a manner as to set itself centrally in relation to the base of the teat.

The construction of the apparatus in other regards, as above indicated, is immaterial and does not form the subject-matter of this invention. Fig. 1 serves, therefore, only as an example to render the invention intelligible.

$a$ $a$ are the milking-rollers. They receive their motion to and from each other by means of the rod $f$, which engages with one of the cogged segments formed on the arms or legs $b$ $b$, while the other end is formed like a piston $g$, which moves in a cylinder $h$. A projection $g'$ from this piston comes in contact with a projection $i$ on an oscillating disk $k$. This latter can be replaced by a rotating eccentric disk. The movement of the rod $f$ is maintained in the other direction by means of spring $l$.

The up-and-down motion of the rollers $a$ is effected by a rotating disk $n$, which is connected to the cylinder $h$ by a pivot-link $n'$. Cylinder $h$ oscillates round a pivot $p$ on the frame $o$. The spring $l'$ tends to hold the cylinder $h$ in its upper position. During the movement downward of the rollers $a$ the resistance or kicking necessary to effect the automatic adjusting or centering of the apparatus in relation to the teat is obtained by means of the convex plate $e$, which rests against the base of the teat and which is attached to the frame $o$ of the apparatus by the arm $q$. The plate $e$ is provided with a hole, into which the teat is inserted for passing downward between the rollers $a$ $a$. It is convenient that the apparatus be attached to the animal in such a manner that the plate by means of overweight is pressed against the udder during the milking operation.

In order to attain the movability of the milking organ in every direction and in such a manner that this organ adjusts itself automatically to the teat according to the requirement of the latter, the frame $o$ is movable in a vertical plane around the pivot $r$ and axially around a pivot $s$ on the block $t$. The frame $o$, together with the block $t$, is, moreover, movable in a vertical plane round the point $u$.

For illustrating the importance of the plate $e$ offering the resistance necessary and the movable arrangement of the milking organ, Figs. 2, 3, and 4 show some of the positions taken by the apparatus while the milking organ is adjusting or centering itself. Thus Fig. 2 shows the relative position of the apparatus and the milking organ at the commencement of the milking. It is here supposed that the teat has assumed an inclined position relatively to the milking organ by the passing of the teat through the plate $e$—that is, the teat has not its proper position in relation to the milking organ. It is also supposed that the plate $e$ is not resting against the base of the teat. When the apparatus is set in motion, the rollers grip the end of the teat, and as during this movement there is no resistance or kicking offered by the rollers against the pulling of the teat, as the plate $e$ does not rest against the base of the teat, said plate slides upward on the teat. Fig. 3 shows the position of the apparatus when the plate has arrived half-way on the teat. By comparing Fig. 2 with Fig. 3 it will be observed that the milking organ is moved upward a little owing to the support offered to the teat by the edge of the hole in the plate $e$ through which the teat passes. The teat has also been strained a little. In Fig. 4 the plate has arrived at the base of the teat and the milking organ has moved still more upward, so that the teat is in a vertical position, or nearly so, in the hole of the plate $e$. Now the teat is strained completely and the rollers move then upward and grip the teat at the base for performing the milking.

It is evident that the teat may alter its position in any manner, yet the apparatus will follow and restore the proper position between teat and milking organ, and this result is due to the employment of the plate $e$, by which a resistance or kicking is offered, together with the employment of the jointed or movable apparatus.

In this application I do not claim the pivoted arrangement of the members $o$ $t$ for attaining the movability of the milking organ in every direction, this being done by my application, Serial No. 530,877, filed December 5, 1894; but

What I claim herein, and desire to secure by Letters Patent, is—

In a mechanical milking-apparatus, the combination of two arms, means for connecting them movably together with respect to each other, milking-organs attached to one of the arms, a plate or ring attached to the other of said arms and located above the milking organs, and operating mechanism for moving said arms, substantially as set forth.

In testimony that I claim the foregoing as my invention I have signed my name in presence of two subscribing witnesses.

CARL GUSTAF PATRIK DE LAVAL.

Witnesses:
H. DAHLGREN,
WALDEMAR BOMAN.